United States Patent
Zhang

(10) Patent No.: US 10,714,793 B2
(45) Date of Patent: Jul. 14, 2020

(54) RECHARGEABLE BATTERY ASSEMBLY AND TERMINAL DEVICE

(71) Applicant: GUANGDONG OPPO MOBILE TELECOMMUNICATIONS CORP., LTD., Dongguan (CN)

(72) Inventor: Jialiang Zhang, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 848 days.

(21) Appl. No.: 15/325,504

(22) PCT Filed: Feb. 29, 2016

(86) PCT No.: PCT/CN2016/074912
§ 371 (c)(1),
(2) Date: Jan. 11, 2017

(87) PCT Pub. No.: WO2016/155447
PCT Pub. Date: Oct. 6, 2016

(65) Prior Publication Data
US 2017/0179547 A1   Jun. 22, 2017

(30) Foreign Application Priority Data
Mar. 27, 2015 (CN) .......................... 2015 1 0142272

(51) Int. Cl.
*G01N 27/416* (2006.01)
*H01M 10/44* (2006.01)
(Continued)

(52) U.S. Cl.
CPC ......... *H01M 10/443* (2013.01); *H01M 2/348* (2013.01); *H01M 10/486* (2013.01);
(Continued)

(58) Field of Classification Search
CPC ............... G01R 31/36; G01R 31/3646; G01R 31/3647; G01R 31/371; G01R 31/374;
(Continued)

(56) References Cited

U.S. PATENT DOCUMENTS 6,577,883 B1    6/2003  Ueda
8,476,864 B2 *  7/2013  Ferre Fabregas ...... G01R 1/203
                                                     320/104
(Continued)

FOREIGN PATENT DOCUMENTS

CN    101847748 A    9/2010
CN    102569931 A    7/2012
(Continued)

OTHER PUBLICATIONS

International Search Report issued in the counterpart International Application No. PCT/CN2016/074912, dated May 19, 2016 (3 pages).
(Continued)

*Primary Examiner* — Thang X Le
(74) *Attorney, Agent, or Firm* — Osha Liang LLP

(57) ABSTRACT

The present disclosure provides a rechargeable battery assembly and a terminal device. The terminal device is equipped with a rechargeable battery assembly. The rechargeable battery assembly comprises a battery main body (110), at least one temperature measurement element (120), and a processor. The battery main body comprises a cell (112) and at least two battery tabs (114). A charging current from a charging device is transmitted to the cell through the battery tabs. One temperature measurement element is corresponding to one battery tab, and the temperature measurement element is used for detecting the temperature of the corresponding battery tab, and transmitting, to the processor (140), temperature information indi-
(Continued)

cating the temperature of the corresponding battery tab. The processor is used for acquiring the temperature information from the temperature measurement element, and for determining the temperature of the cell according to the temperature information.

14 Claims, 2 Drawing Sheets

(51) Int. Cl.
H02H 7/18 (2006.01)
H01M 2/34 (2006.01)
H01M 10/48 (2006.01)
H02J 7/00 (2006.01)
H01M 10/42 (2006.01)

(52) U.S. Cl.
CPC ...... *H02H 7/18* (2013.01); *H01M 2010/4278* (2013.01); *H01M 2200/103* (2013.01); *H01M 2220/30* (2013.01); *H02J 7/0091* (2013.01)

(58) Field of Classification Search
CPC .. G01R 31/382; G01R 31/385; G01R 31/386; G01R 31/3865; G01R 31/392; G01R 31/389; H01M 2/14; H01M 10/443; H01M 10/486; H01M 10/425
See application file for complete search history.

(56) References Cited

U.S. PATENT DOCUMENTS

| | | | |
|---|---|---|---|
| 2005/0073314 A1 | 4/2005 | Bertness et al. | |
| 2010/0109611 A1* | 5/2010 | Schaefer | H01M 10/0525 320/134 |
| 2010/0309949 A1* | 12/2010 | Akaboshi | H01M 2/1077 374/45 |
| 2011/0285357 A1 | 11/2011 | Kikuchi et al. | |
| 2013/0187614 A1 | 7/2013 | Bhardwaj | |
| 2013/0264999 A1 | 10/2013 | Srinivasan et al. | |
| 2014/0023897 A1* | 1/2014 | Suga | H01M 10/48 429/90 |
| 2014/0370940 A1 | 12/2014 | Yoshida | |
| 2016/0043446 A1* | 2/2016 | Fritz | H01M 10/425 429/90 |
| 2017/0133656 A1* | 5/2017 | Roemer | H01M 2/1077 |

FOREIGN PATENT DOCUMENTS

| | | |
|---|---|---|
| CN | 20487722 U | 10/2012 |
| CN | 103078358 A | 5/2013 |
| CN | 203455103 U | 2/2014 |
| CN | 103698580 A | 4/2014 |
| CN | 204101707 U | 1/2015 |
| CN | 104953642 A | 9/2015 |
| CN | 204761046 U | 11/2015 |
| EP | 2782184 A1 | 9/2014 |
| EP | 2842797 A1 | 3/2015 |
| JP | 201140387 A | 2/2011 |
| JP | 201154342 A | 3/2011 |
| JP | 2014107264 A | 6/2014 |
| JP | 2014527684 A | 10/2014 |

OTHER PUBLICATIONS

Written Opinion issued in the counterpart International Application No. PCT/CN2016/074912, dated May 13, 2016 (4 pages).
Office Action issued in the counterpart Chinese Patent Application No. 201510142272X, dated Sep. 1, 2016 (15 pages).
Extended European Search Report issued in corresponding European Application No. 16771202.5 dated Jul. 6, 2018 (7 pages).
Office Action issued in corresponding Singapore Application No. 11201700718Y, dated Oct. 11, 2017 (9 pages).
Office Action issued in corresponding Japanese Application No. 2017-509040, dated Nov. 7, 2017 (6 pages).
Office Action issued in corresponding Australian Application No. 2016240270, dated Nov. 16, 2017 (3 pages).
Office Action issued in corresponding Korean Application No. 10-2017-7004039, dated Dec. 8, 2017 (12 pages).

* cited by examiner

RECHARGEABLE BATTERY ASSEMBLY AND TERMINAL DEVICE

CROSS-REFERENCE TO RELATED APPLICATIONS

This application is based upon and claims a priority to Chinese Patent Application Serial No. 201510142272.X, entitled "rechargeable battery assembly and terminal device", filed with the State Intellectual Property Office of P. R. China on Mar. 27, 2015, the entire contents of which are incorporated herein by reference.

TECHNICAL FIELD

The present disclosure generally relates to charging technical field, and more particularly, to a rechargeable battery assembly and a terminal device.

BACKGROUND

Nowadays, electronic devices such as mobile phones are typically configured with rechargeable batteries which may be charged through power adapters.

During the charging, a power adapter converts alternating current into direct current at rated voltage, and then transmits the direct current to a rechargeable battery in an electronic device.

Further, during the charging, the battery emits heat inevitably, particularly, when the charging voltage or the charging current is too large, the quantity of heat emitted by the battery increases sharply, which may cause damage to the battery or even an explosion, thereby affecting use safety seriously. If a temperature of the battery may be acquired in time, a charging circuit may be cut off in time once the temperature of the battery exceeds a safety threshold, such that the purpose of protecting the battery and improving use safety may be realized.

Therefore, how to acquire the temperature of the battery (specifically, a cell of the battery) accurately becomes an urgent problem to be solved.

BRIEF DESCRIPTION OF THE DRAWINGS

In order to make technique solutions according to embodiments of the present disclosure more apparent, drawings needed to be used in descriptions of the embodiments will be illustrated in the following. Obviously, the drawings to be illustrated in the following only represent some embodiments of the present disclosure, and other drawings can be obtained according these drawings by those having ordinary skills in the related art without making creative labors.

DETAILED DESCRIPTION

The technical solutions in embodiments of the present invention are hereinafter described clearly and completely with reference to accompanying drawings in embodiments of the present invention. Apparently, embodiments described are a part of embodiments of the present invention, but not all embodiments. All other embodiments obtained by those skilled in the art based on the embodiments in the present invention without creative labor shall fall in the protection scope of the present invention.

Figure 1:
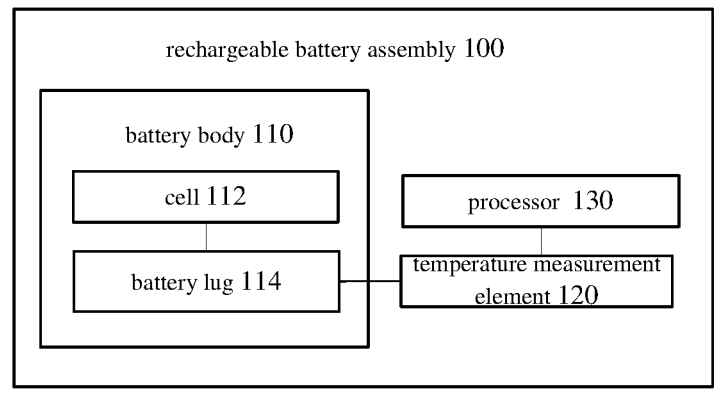
FIG. 1 is a block diagram of a rechargeable battery assembly according to an embodiment of the present disclosure.

FIG. 1 is a block diagram of a rechargeable battery assembly 100 according to an embodiment of the present disclosure. As illustrated in FIG. 1, the rechargeable battery assembly 100 includes a battery body 110, at least one temperature measurement element 120 and a processor 130.

The battery body 110 includes a cell 112 and at least two battery lugs 114. A charging current from a charging device is transmitted to the cell 112 through the at least two battery lugs 114.

Each temperature measurement element 120 corresponds to one battery lug 114. The temperature measurement element 120 is configured to detect a temperature of the battery lug 114 corresponding to the temperature measurement element 120, and to transmit temperature information indicating the temperature of the corresponding battery lug 114 to the processor 130.

The processor 130 is configured to acquire the temperature information from the at least one temperature measurement element 120, and to determine a temperature of the cell 112 according to the temperature information.

In the following, respective components in the rechargeable battery assembly 100 will be described in detail.

A. Battery Body 110

The battery body 110 includes a cell 112 and at least two battery lugs 114.

Figure 2:
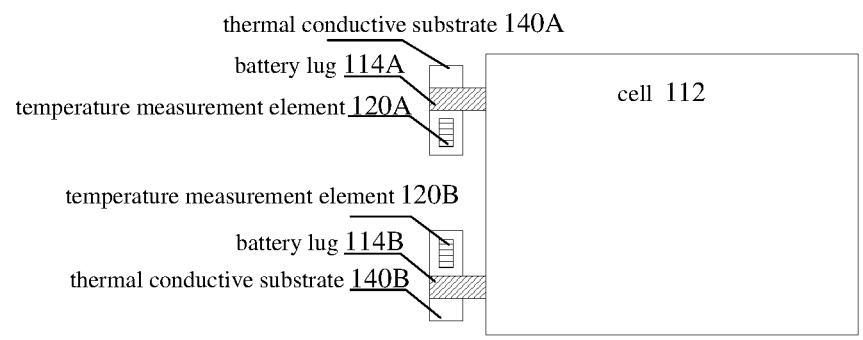
FIG. 2 is a schematic diagram of a rechargeable battery assembly according to an embodiment of the present disclosure.

In an embodiment of the present disclosure, FIG. 2 illustrates a scene in which the battery body 110 includes two battery lugs (i.e., an example of at least two battery lugs). The two battery lugs 114 include a cathode battery lug 114A (as illustrated in FIG. 2, hereinafter, battery lug 114A for short) and an anode battery lug 114B (as illustrated in FIG. 2, hereinafter, battery lug 114B for short). On a current transmission path, the cell 112 is disposed between the battery lug 114A and the battery lug 114B, and a charging loop may be formed by coupling a positive output terminal of a charging circuit (such as a power adapter) with the battery lug 114A and coupling a ground terminal of the charging circuit with the battery lug 114B, such that the cell 112 may be charged.

In addition, in an embodiment of the present disclosure, a fuse may be disposed between the battery lug 114A and the cell 112, such that input current from the battery lug 114A flows into the cell 112 through the fuse. The fuse has a certain resistance, such that the fuse generates heat due to thermal effect after the input current from the battery lug 114A flows through the fuse. If the current is large enough to make the heat generated by the fuse reach the melting point of the fuse, the fuse is melted, such that the charging circuit for the cell 112 can be cut off.

Therefore, the over-charge protection of the cell may be realized by selecting the fuse made of appropriate material based on the specification (such as, allowed maximum charging current) of the cell.

It should be understood that, the above mentioned structure of the battery body 110 is merely illustrative, and the present disclosure is not limited thereto. Other rechargeable batteries charging the cells through the battery lugs shall fall within the scope of the present disclosure. For example, the number of the battery lugs is merely illustrative, and the present disclosure is not limited thereto. The number of the battery lugs may be varied arbitrarily.

B. Temperature Measurement Element 120

In an embodiment of the present disclosure, for example, various forms of temperature sensors may be selected as the temperature measure elements 120 according to the configuration space of the battery in a terminal device.

In an embodiment of the present disclosure, there may be one or more temperature measurement elements 120, which is not limited herein. In order to ensure the accuracy of measurement, one temperature element 120 only corresponds to one battery lug 114. In other words, one temperature element 120 is configured to measure the temperature of one battery lug 114 only.

In at least one embodiment, the rechargeable battery assembly includes at least two temperature measurement elements, and the at least two temperature measurement elements have a one-to-one correspondence with the at least two battery lugs.

Specifically, in an embodiment of the present disclosure, the number of temperature measurement elements may be determined according to the number of battery lugs. For example, the number of battery lugs is equal to the number of temperature measurement elements, such that the temperatures of all the battery lugs may be acquired by employing each temperature measurement element to measure the temperature of the corresponding battery lug.

For example, as illustrated in FIG. 2, when the battery body 110 includes the battery lug 114A and the battery lug 114B, two temperature measurement elements, i.e., temperature measurement element 120A and temperature measurement element 120B may be provided. The temperature measurement element 120A is corresponding to the battery lug 114A, and is configured to measure the temperature of the battery lug 114A. The temperature measurement element 120B is corresponding to the battery lug 114B, and is configured to measure the temperature of the battery lug 114B.

The configurations of the temperature measurement element 120 and the battery lug 114 will be described below in detail.

In an embodiment of the present disclosure, when a plurality of temperature measurement elements 120A are provided, the configurations of respective temperature measurement elements and corresponding battery plugs may be same or similar. For simplicity, description is made by taking the configuration of the temperature measurement element 120A and the battery lug 114A illustrated in FIG. 2 as an example.

For example, in an embodiment of the present disclosure, the temperature measurement element 120A may be directly attached on a surface of the battery lug 114A.

For another example, in an embodiment of the present disclosure, the temperature measurement element and the corresponding battery lug are disposed on a same thermal conductive substrate, and there is a preset space between the temperature measurement element and the corresponding battery lug.

Specifically, FIG. 2 illustrates a top view of an unfolded profile of a battery body provided with battery lugs, thermal conductive substrates and temperature measurement elements.

As illustrated in FIG. 2, the temperature measurement element 120A and the battery lug 114A may be disposed on the thermal conductive substrate 140A, such that heat of the battery lug 114A may be transferred to the temperature measurement element 120A through the thermal conductive substrate 140A. The battery lug 114A and the temperature measurement element 120A are separated with a preset space a. For example, the size of space a may be adjusted according to the configuration of the rechargeable battery assembly 100 in the terminal device, for example, when the rechargeable battery assembly 100 is detachable with regard to the terminal device, such that the interference on electric connection between the battery lug 114A and an electric conductive contact of the terminal device due to a smaller distance or an attachment between the temperature measurement element 120A and the battery lug 114A may be avoided.

In at least one embodiment, the thermal conductive substrate is made of metal.

In an embodiment of the present disclosure, in order to improve thermal conductivity of the thermal conductive substrate, the thermal conductive substrate is preferably made of metal. Moreover, the thermal conductive substrate is made as thin as possible, so as to further improve the thermal conductivity. For example, copper foil may be used as the thermal conductive substrate.

In an embodiment of the present disclosure, an insulating thermal conductive layer may be disposed between the temperature measurement element and the thermal conductive substrate.

In another embodiment of the present disclosure, an insulating thermal conductive layer may be disposed between the battery lug corresponding to the temperature measurement element and the thermal conductive substrate.

In an embodiment, since the current flows through the battery lug during the charging or discharging of the rechargeable battery assembly 100, there may be a situation that the current is transmitted to the temperature measurement element 120A from the battery lug 114A through the thermal conductive substrate 140A if the thermal conductive substrate made of metal is used. When an electronic element such as an electronic temperature sensor is used as the temperature measurement element 120A, the current from the battery lug 114A flowing into the temperature measurement element 120A through the thermal conductive substrate 140A may have an influence on the temperature measurement element 120A. By disposing an insulation layer between the temperature measurement element 120A and the thermal conductive substrate 140A or disposing an insulation layer between the battery lug 114A and the thermal conductive substrate 140A, the influence on the temperature measurement element 120A from external current may be avoided effectively when the heat is conducted, thus improving safety and reliability of the rechargeable battery assembly.

It should be understood that, the above mentioned material and shape of the thermal conductive substrate are merely illustrative, and the present disclosure is not limited thereto. Any material or shape is feasible as long as the heat may be transferred from the battery lug to the temperature measurement element. For example, a printed circuit board (PCB) with a thermal conductive layer on the surface thereof may be used as the thermal conductive substrate.

C. Processor 130

In an embodiment of the present disclosure, the processor 130 is in communication connection with the at least one temperature measurement element 120, so as to acquire the temperature information transmitted by the at least one temperature measurement element 120 and to determine the temperature of the cell according to the temperature information.

In at least one embodiment, the temperature measurement element is configured to detect the temperature of the corresponding battery lug within at least two time periods, and to transmit at least two pieces of temperature information to the processor, in which the at least two pieces of temperature information have a one-to-one correspondence with the at least two time periods, and each piece of temperature information is used for indicating a temperature of the corresponding battery lug within the corresponding time period.

The processor is configured to perform an averaging processing on the at least two pieces of temperature information, so as to determine the temperature of the cell.

In an embodiment, for any one temperature measurement element (for ease of comprehension, taking the temperature measurement element 120A as an example), the temperature of the battery lug 114A may be measured for many times during a temperature measuring cycle, (i.e., the temperature of the battery lug 114A is measured within at least two time periods), such that the temperature measurement element 120A may send to the processor 130 a plurality of pieces of temperature information related to the battery lug 114A, for indicating multiple temperature values of the battery lug 114A at different time points (here, these multiple temperature values may be identical or different, which is not limited herein).

Then, the processor 130 may perform an averaging processing on the multiple temperature values, for example, an arithmetic mean value is calculated and used as the temperature of the battery lug 114A.

It should be understood that, the above mentioned implementation of averaging processing is merely illustrative, and the present disclosure is not limited thereto.

In at least one embodiment, the processor is configured to acquire at least two pieces of temperature information from the at least two temperature measurement elements, and to perform an averaging processing on the at least two pieces of temperature information so as to determine the temperature of the cell, in which the at least two temperature measurement elements have a one-to-one correspondence with the at least two pieces of temperature information.

It should be understood that, the above mentioned process of determining the temperature of the battery lug is merely illustrative, and the present disclosure is not limited thereto. For example, the processor 130 may receive one piece of temperature information transmitted by the temperature measurement element 120A only, and use the only one temperature value as the temperature of the battery lug 114A. In at least one embodiment, the processor 130 may determine a maximum temperature value as the temperature of the battery lug 114A after receiving a plurality of pieces of temperature information transmitted by the temperature measurement element 120A.

In at least one embodiment, in a situation that a plurality of temperature measurement elements are provided, the processor 130 may perform an averaging processing on the temperature values of respective battery lugs after determining the temperature values of respective battery lugs. For example, an arithmetic mean value is calculated and used as the temperature of the cell 112.

It should be understood that, the above mentioned implementation of averaging processing is merely illustrative, and the present disclosure is not limited thereto.

Moreover, the above mentioned process of determining the temperature of the battery lug is merely illustrative, and the present disclosure is not limited thereto. For example, the processor 130 may determine the temperature value of one battery lug only, and use the only one temperature value as the temperature of the cell. In at least one embodiment, the processor 130 may determine a maximum temperature value as the temperature of the cell after determining a plurality of temperature values of a plurality of battery lugs.

Figure 3:
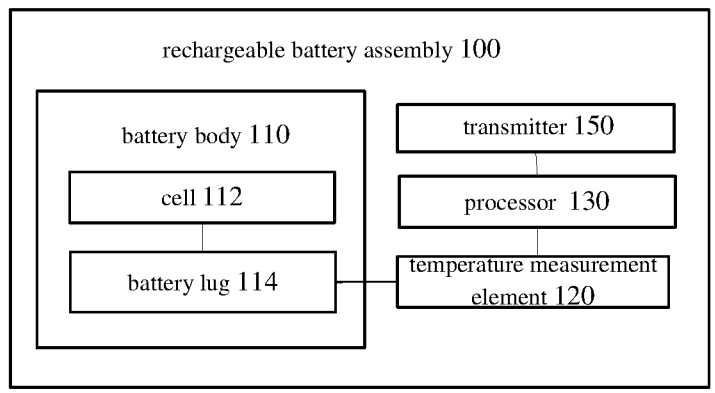
FIG. 3 is a block diagram of a rechargeable battery assembly according to another embodiment of the present disclosure.

FIG. 3 is a block diagram of a rechargeable battery assembly according to another embodiment of the present disclosure. As shown in FIG. 3, the rechargeable battery assembly further includes a transmitter 150.

The transmitter 150 is configured to acquire information indicating the temperature of the cell from the processor 130, and to transmit the information indicating the temperature of the cell to a terminal device or a power adapter.

In an embodiment, the rechargeable battery assembly 100 may be further provided with the transmitter 150. After the processor 130 determines that the temperature of the cell exceeds a safety threshold, the transmitter 150 may send the information indicating the temperature of the cell to the power adapter or the terminal device, such that the power adapter or the terminal device may further determine whether to cut off the charging circuit according to the temperature of the cell.

In at least one embodiment, the processor 130 may transmit the information indicating the temperature of the cell to the power adapter or the terminal device directly through the transmitter 150, such that the power adapter or the terminal device may further determine whether to cut off the charging circuit according to the temperature of the cell.

In at least one embodiment, after the processor 130 determines that the temperature of the cell exceeds a safety threshold, control information instructing to cut off the charging circuit is transmitted to the power adapter or the terminal device through the transmitter 150, such that the power adapter or the terminal device may cut off the charging circuit according to the control information.

FIG. 2 illustrates a schematic diagram of connections of components in the rechargeable battery assembly according to an embodiment of the present disclosure. As illustrated in FIG. 2, the battery body 110 includes a cell 112, a cathode battery lug 114A and an anode battery lug 114B. The cathode battery lug 114A may be coupled with a positive pole of the charging device through a positive input port (not shown) of the terminal device, and the anode battery lug 114B may be coupled with a ground terminal of the charging device through a negative input port (not shown) of the terminal device, such that the charging circuit for the cell 112 is formed.

The cathode battery lug 114A and the temperature measurement element 120A are disposed on the thermal conductive substrate 140A, such that the heat released by the cathode battery lug 114A may be transferred to the temperature measurement element 120A through the thermal conductive substrate 140A, and the temperature of the cathode battery lug 114A may be detected via the temperature measurement element 120A. The anode battery lug 114B and the temperature measurement element 120B are disposed on the thermal conductive substrate 140B, such that the heat released by the anode battery lug 114B may be transferred to the temperature measurement element 120B through the thermal conductive substrate 140B, and the temperature of the anode battery lug 114B may be detected via the temperature measurement element 120B.

In addition, although not illustrated in FIG. 2, a processor is included in the rechargeable battery assembly. The processor is in communication connection with the at least one temperature measurement element (for example, via a communication cable, or via wireless transmission technology).

It should be understood that, the structure of the rechargeable battery assembly illustrated in FIG. 2 is merely illustrative, and the present disclosure is not limited thereto. For example, the thermal conductive substrate 140A and the thermal conductive substrate 140B may be integrally formed, or one common thermal conductive substrate may be used as the thermal conductive substrate 140A and the thermal conductive substrate 140B. In this case, in order to avoid interference, it is required to maintain a sufficiently long distance between the temperature measurement element 120A and the battery lug 114B. Similarly, it is required to maintain a sufficiently long distance between the temperature measurement element 120B and the battery lug 114A.

Figure 4:
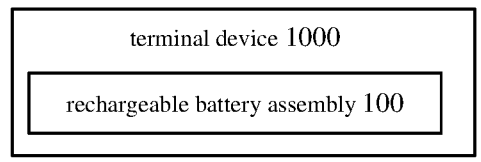
FIG. 4 is a block diagram of a terminal device according to an embodiment of the present disclosure.

Embodiments of the present disclosure further provide a terminal device. As shown in FIG. 4, the terminal device 1000 is configured with the rechargeable battery assembly 100 described above, which will not be elaborated herein.

The rechargeable battery assembly and the terminal device according to embodiments of the present disclosure are configured with the temperature measurement element for measuring the temperature of the battery lug, such that the temperature of the cell may be accurately acquired according to the temperature of the battery lug, and the temperature of the cell may be monitored in real time. For example, when the temperature of the cell exceeds a safety threshold, the charging circuit may be cut off to realize the purpose of protecting the battery and improving use safety.

The rechargeable battery assembly 100 according to embodiments of the present disclosure may be applied in a terminal device. In an embodiment of the present disclosure, the terminal device may be a device with a built-in battery and capable of obtaining current from outside to charge the battery, such as a mobile phone, a tablet PC, a computing device or an information display device, etc.

The terminal device applicable in the present disclosure is explained by taking a mobile phone as an example. In an embodiment of the present disclosure, the mobile phone may include a radio frequency circuit, a memory, an input unit, a wireless fidelity (WiFi) module, a display unit, a sensor, an audio circuit, a processor, a projecting unit, a camera unit, a battery or other components.

The radio frequency circuit may be configured to receive and send signals during an information receiving and sending process or a call process. Particularly, the radio frequency circuit receives downlink information from a base station, then delivers the downlink information to the processor for processing, and sends uplink data of the mobile phone to the base station. Generally, the radio frequency circuit includes, but is not limited to, an antenna, at least one amplifier, a transceiver, a coupler, a low noise amplifier (LNA), and a duplexer. In addition, the radio frequency circuit may also communicate with a network and another device by wireless communication. The wireless communication may use any communication standard or protocol, which includes, but is not limited to, Global System for Mobile communications (GSM), General Packet Radio Service (GPRS), Code Division Multiple Access (CDMA), Wideband Code Division Multiple Access (WCDMA), Long Term Evolution (LTE), e-mail, Short Messaging Service (SMS), and the like.

The memory may be configured to store a software program and modules. The processor runs the software program and modules stored in the memory, to implement various functional applications and data processing of the mobile phone. The memory may mainly include a program storage area and a data storage area. The program storage area may store an operating system, an application program required by at least one function (such as a sound playback function and an image display function), and the like. The data storage area may store data (such as audio data and an address book, etc.) created according to use of the mobile phone, and the like. In addition, the memory may include a high speed random access memory, and may also include a non-volatile memory such as at least one magnetic disk storage device, a flash memory, or another volatile solid-state storage device.

The input unit may be configured to receive input digit or character information, and generate a keyboard signal related to the user setting and function control of the mobile phone. Specifically, the input unit may include a touch-sensitive panel and another input device. The touch-sensitive panel, which may also be referred to as a touch screen, may collect a touch operation of a user on or near the touch-sensitive panel (such as an operation of a user on or near the touch-sensitive panel by using any suitable object or accessory, such as a finger or a stylus), and drive a corresponding connection apparatus according to a preset program. Optionally, the touch-sensitive panel may include two parts: a touch detection apparatus and a touch controller. The touch detection apparatus detects a touch position of the user, detects a signal generated by the touch operation, and transfers the signal to the touch controller. The touch controller receives the touch information from the touch detection apparatus, converts the touch information into touch point coordinates, and sends the touch point coordinates to the processor. Moreover, the touch controller can receive and execute a command sent from the processor. In addition, the touch-sensitive panel may be may be a resistive, capacitive, infrared, or surface sound wave type touch-sensitive panel. In addition to the touch-sensitive panel, the input unit may further include the input device. Specifically, the input device may include, but is not limited to, one or more of a physical keyboard, a functional key (such as a volume control key or a switch key), a track ball, a mouse, and a joystick.

The display unit may be configured to display information input by the user or information provided for the user, and various menus of the mobile phone. The display unit may include a display panel. Optionally, the display panel may be configured by using a liquid crystal display (LCD), an organic light-emitting diode (OLED), or the like. Further, the touch-sensitive panel may cover the display panel. After detecting a touch operation on or near the touch-sensitive panel, the touch-sensitive panel transfers the touch operation to the processor, so as to determine the type of the touch event. Then, the processor provides a corresponding visual output on the display panel according to the type of the touch event.

The region in the display panel displaying the visual output which can be identified by human eyes may be used as the after-mentioned "display area". The touch-sensitive panel and the display panel may be used as two separated parts to realize the input and output function of the mobile phone, or may be integrated to realize the input and output function of the mobile phone.

In addition, the mobile phone may further include at least one sensor, such as a pressure sensor, a temperature sensor, an attitude sensor, an optical sensor, and other sensors.

Specifically, the attitude sensor may also be referred to as the motion sensor. As one type of motion sensor, a gravity sensor may be enumerated. The gravity sensor may be made into a cantilever type shifter using an elastic sensitive element, and drive an electric contact using an energy storage spring made of an elastic sensitive element, such that the gravity change may be converted into the change of an electric signal.

As one type of motion sensor, an acceleration sensor may be enumerated. The acceleration sensor can detect magnitude of accelerations in various directions (generally on three axes), may detect magnitude and a direction of the gravity when static, and may be applied to an application that recognizes the attitude of the mobile phone (for example, switching between landscape orientation and portrait orientation, a related game, and magnetometer attitude calibration), a function related to vibration recognition (such as a pedometer and a knock), and the like.

In an embodiment of the present disclosure, the above mentioned motion sensor may be used as an element for acquiring the after-mentioned "attitude parameters", but the present disclosure is not limited thereto. Other sensors able to acquire "attitude parameters" shall fall within the scope of the present disclosure, such as a gyroscope. The working principle and data processing of the gyroscope may be similar to those in the related art, the detailed explanations are omitted for simplicity.

In addition, in an embodiment of the present disclosure, other sensors, such as a barometer, a hygrometer, a thermometer, and an infrared sensor can be configured as the sensor, which are not further described herein.

The optical sensor may include an ambient light sensor and a proximity sensor. The ambient light sensor can adjust luminance of the display panel according to brightness of the ambient light. The proximity sensor may switch off the display panel and/or backlight when the mobile phone is moved to the ear.

The audio circuit, a loudspeaker, and a microphone may provide audio interfaces between the user and the mobile phone. The audio circuit may convert received audio data into an electric signal and transmit the electric signal to the loudspeaker. The loudspeaker converts the electric signal into a sound signal for output. On the other hand, the microphone converts a collected sound signal into an electric signal. The audio circuit receives the electric signal and converts the electric signal into audio data, and outputs the audio data to the processor for processing. Then, the processor sends the audio data to, for example, another terminal device by using the radio frequency circuit, or outputs the audio data to the memory for further processing.

WiFi is a short distance wireless transmission technology. The mobile phone may help, by using the WiFi module, the user to receive and send e-mails, browse a webpage, access streaming media, and so on, which provides wireless broadband Internet access for the user. In addition, when required, the WiFi module may be omitted as long as the scope of the essence of the present disclosure is not changed.

The processor is the control center of the mobile phone, and is coupled with various parts of the mobile phone by using various interfaces and lines. By running or executing the software program and/or modules stored in the memory, and invoking data stored in the memory, the processor performs various functions and data processing of the mobile phone, thereby performing overall monitoring on the mobile phone. Optionally, the processor may include one or more processing cores. Preferably, the processor may integrate an application processor and a modem. The application processor mainly processes an operating system, a user interface, an application program, and the like. The modem mainly processes wireless communication.

It may be understood that the foregoing modem may also not be integrated into the processor.

Moreover, the processor, used as an implementing element of the above mentioned processor, may perform same or similar functions as the processing cores.

The mobile phone further includes the power supply (such as a battery) for supplying power to the components.

Preferably, the power supply may be logically coupled with the processor by using a power management system, thereby implementing functions such as charging, discharging and power consumption management by using the power management system. Although not shown in the figure, the mobile phone may further include a Bluetooth module, and the like, which is not further described herein.

It should be noted that, the mobile phone is merely an example of the terminal device, and the present disclosure is not limited thereto. The present disclosure may be applied in a mobile phone, a tablet, or other electronic device, which is not limited herein.

In embodiments of the present disclosure, it should be understood that, the units illustrated as separate components can be or not be separated physically, and components described as units can be or not be physical units, i.e., can be located at one place, or can be distributed onto multiple network units. It is possible to select some or all of the units according to actual needs, for realizing the objective of embodiments of the present disclosure.

The forgoing description is only directed to preferred embodiments of the present disclosure, but not used to limit the present disclosure. All modifications, equivalents, variants and improvements made within the spirit and principle of the present disclosure shall fall within the protection scope of the present disclosure. Thus, the protection scope of the present disclosure shall be limited by the protection scope of the claims.

What is claimed is:

1. A rechargeable battery assembly, comprising:
a battery body, comprising a cell and at least two battery lugs, the at least two battery lugs being configured to transmit charging current from a charging device to the cell;
at least one temperature measurement element corresponding to the at least two battery lugs, the at least one temperature measurement element being configured to detect temperature information of the at least two battery lugs; and
a processor that is configured to acquire the temperature information from the at least one temperature measurement element, and to determine a temperature of the cell according to the temperature information;
wherein, the temperature measurement element and the corresponding battery lug are disposed on a same thermal conductive substrate, and there is a preset space between the temperature measurement element and the corresponding battery lug; wherein, the thermal conductive substrate is made of metal;
wherein the rechargeable battery assembly further comprises an insulating thermal conductive layer, wherein, the insulating thermal conductive layer is disposed between the temperature measurement element and the thermal conductive substrate, configured for conducting heat while avoiding influence on the temperature measurement element from current.

2. The rechargeable battery assembly according to claim 1, wherein, the insulating thermal conductive layer is disposed between the battery lug corresponding to the temperature measurement element and the thermal conductive substrate.

3. The rechargeable battery assembly according to claim 1, wherein, the rechargeable battery assembly comprises at least two temperature measurement elements, and the at least two temperature measurement elements have a one-to-one correspondence with the at least two battery lugs.

4. The rechargeable battery assembly according to claim 1, wherein, the processor is configured to acquire at least two pieces of temperature information from the at least two temperature measurement elements, and to perform an averaging processing on the at least two pieces of temperature information so as to determine the temperature of the cell, wherein the at least two temperature measurement elements have a one-to-one correspondence with the at least two pieces of temperature information.

5. The rechargeable battery assembly according to claim 1, wherein,
the temperature measurement element is configured to detect the temperature of the corresponding battery lug within at least two time periods, and to transmit at least two pieces of temperature information to the processor, wherein the at least two pieces of temperature information have a one-to-one correspondence with the at least two time periods, and each piece of temperature information is used for indicating a temperature of the corresponding battery lug within the corresponding time period; and
the processor is configured to perform an averaging processing on the at least two pieces of temperature information, so as to determine the temperature of the cell.

6. The rechargeable battery assembly according to claim 1, further comprising:
a transmitter, configured to acquire information indicating the temperature of the cell from the processor, and to transmit the information indicating the temperature of the cell to a terminal device or a power adapter.

7. The rechargeable battery assembly according to claim 1, wherein respective thermal conductive substrates are integrally formed.

8. A terminal device configured with a rechargeable battery assembly, the rechargeable battery assembly comprising:
a battery body, comprising a cell and at least two battery lugs, the at least two battery lugs being configured to transmit charging current to the cell;
at least one temperature measurement element, corresponding to the at least two battery lugs, the at least one temperature measurement element being configured to detect temperature information of the at least two battery lugs; and
a processor, configured to acquire the temperature information from the at least one temperature measurement element, and to determine a temperature of the cell according to the temperature information;
wherein, the temperature measurement element and the corresponding battery lug are disposed on a same thermal conductive substrate, and there is a preset space between the temperature measurement element and the corresponding battery lug; wherein, the thermal conductive substrate is made of metal;
wherein the rechargeable battery assembly further comprises an insulating thermal conductive layer, wherein, the insulating thermal conductive layer is disposed between the temperature measurement element and the thermal conductive substrate, configured for conducting heat while avoiding influence on the temperature measurement element from current.

9. The terminal device according to claim 8, wherein, the insulating thermal conductive layer is disposed between the battery lug corresponding to the temperature measurement element and the thermal conductive substrate.

10. The terminal device according to claim 8, wherein, the rechargeable battery assembly comprises at least two temperature measurement elements, and the at least two temperature measurement elements have a one-to-one correspondence with the at least two battery lugs.

11. The terminal device according to claim 8, wherein, the processor is configured to acquire at least two pieces of temperature information from the at least two temperature measurement elements, and to perform an averaging processing on the at least two pieces of temperature information so as to determine the temperature of the cell, wherein the at least two temperature measurement elements have a one-to-one correspondence with the at least two pieces of temperature information.

12. The terminal device according to claim 8, wherein
the temperature measurement element is configured to detect the temperature of the corresponding battery lug within at least two time periods, and to transmit at least two pieces of temperature information to the processor, wherein the at least two pieces of temperature information have a one-to-one correspondence with the at least two time periods, and each piece of temperature information is used for indicating a temperature of the corresponding battery lug within the corresponding time period, and
the processor is configured to perform an averaging processing on the at least two pieces of temperature information, so as to determine the temperature of the cell.

13. The terminal device according to claim 8, wherein the rechargeable battery assembly further comprises:
a transmitter, configured to acquire information indicating the temperature of the cell from the processor, and to transmit the information indicating the temperature of the cell to a terminal device or a power adapter.

14. The terminal device according to claim 8, wherein respective thermal conductive substrates are integrally formed.

* * * * *